United States Patent [19]

Kassai

[11] Patent Number: 4,597,116
[45] Date of Patent: Jul. 1, 1986

[54] BED FOR BABY CARRIAGES

[75] Inventor: Kenzou Kassai, Osaka, Japan

[73] Assignee: Kassai Kabushikikaisha, Osaka, Japan

[21] Appl. No.: 578,671

[22] Filed: Feb. 9, 1984

[30] Foreign Application Priority Data

Feb. 14, 1983 [JP] Japan .................................. 58-23373

[51] Int. Cl.⁴ .......................... A47D 9/00; A47D 13/02
[52] U.S. Cl. ......................................... 5/99 A; 5/99 R; 297/433; 297/350; 280/47.4; 280/642; 280/648
[58] Field of Search ...................... 5/99 A, 99 B, 99 R, 5/101–108; 280/31, 639, 642, 643, 647, 648, 649, 47.4; 297/433, 118, 350, 377, 92, 93, 14, 51

[56] References Cited

U.S. PATENT DOCUMENTS

| | | | |
|---|---|---|---|
| 604,341 | 5/1898 | Tustison | 5/103 |
| 676,741 | 6/1901 | Flannery | 280/642 |
| 711,583 | 10/1902 | McLellan | 280/642 |
| 2,805,076 | 9/1957 | Thomas | 280/643 |
| 4,181,356 | 1/1980 | Fleischer | 5/99 A |
| 4,391,453 | 7/1983 | Glaser | 280/642 |

Primary Examiner—Kenneth J. Dorner
Assistant Examiner—Vinh Luong
Attorney, Agent, or Firm—W. G. Fasse; D. H. Kane, Jr.

[57] ABSTRACT

A bed for baby carriages which is referred to as a "box type" in the form of a unitary box, has a bottom wall (2), a front wall (3), a back wall (4), and a left-hand and right-hand side walls (5, 6). In such a boxlike bed, when the walls disposed in the front region are removed to open the front, the bed takes the form of a chair. The arrangement for making this change includes a pair of upper side frames (11) which suspend the front portions of the left-hand and right-hand side walls (5, 6). The upper side frames extend along the upper sides of the front portions of the left-hand and right-hand side walls (5, 6) and are turnably supported at their rear ends by transverse shafts.

3 Claims, 12 Drawing Figures

4,597,116

BED FOR BABY CARRIAGES

BACKGROUND OF THE INVENTION

This invention relates to a bed for baby carriages and particularly it relates to a bed for baby carriages which is collapsible, wherein its portion on which a baby is supported in a baby carriage is basically in the form of a bed which is capable of being converted into the form of a chair when desired.

DESCRIPTION OF THE PRIOR ART

Originally or when a baby carriage was first proposed, it was of the so-called "box type" in which a baby is comfortably laid in the baby carriage. For babies, therefore, the box type is preferable from the standpoint of a baby's growth and comfortableness. However, the change of tastes in the course of time has gradually taken the edge off such baby-centered construction concept and placed more importance on the convenience of baby carriages as a means for conveying babies. For example, the chair type now predominates in baby carriages and, further because of the use as a means of transportation, collapsible small-sized baby carriages are most popular. This is an inevitable consequence of various changes in life style and is one of the needs of the times.

The convenience of using baby carriages as a means for conveying babies, as described above, cannot be denied to be an important point in developing a new baby carriage. However, it seems necessary to go back to the starting point and construct a baby carriage which satisfies both needs, the baby's comfort and as a device for transporting a baby. Such a carriage should not hamper a baby's growth and it should be comfortable as well as convenient to use.

SUMMARY OF THE INVENTION

An object of this invention is to provide a bed for baby carriages which does not hamper a baby's growth, which is comfortable for the baby, and convenient for the user. According to this invention, the bed is adapted for changing the shape into a chair form and vice versa.

This invention provides a bed for baby carriages which is of the so-called "box type" and is basically in the form of a unitary box as a whole comprising a bottom wall, a front wall, a back wall, and right-hand and left-hand side walls. In such box-shaped bed, when the walls disposed in the front region are removed to open the front side, the bed takes the form of a chair. The present construction comprises a pair of upper side frames for suspending the front portions of the right-hand and left-hand side walls extending along the upper sides of the front portions of the right-hand and left-side walls. These side frames are turnably supported at their rear ends by transverse shafts. The front portions of the right-hand and left-side walls suspended by the upper side frames, are made of a flexible material. Further, a folding line is formed along the boundary line between the front and rear portions of the bottom wall. In such construction, the downward turning of the upper side frames causes a downward displacement of the front wall thereby folding the front portion of the bottom wall relative to the rear portion along the folding line while bending the front portions of the right-hand and left-hand side walls, whereby the front of the bed is opened to allow the bed to be used as a chair. When the bed is to be used as such, the upper side frames have only to be maintained in a horizontal position, and means for maintaining them in the horizontal position is realized by a pair of prop links in the form of two links foldably connected together.

According to this invention, there is provided a bed for baby carriages which is in the form of a unitary box as a whole which is desirable from the standpoint of baby growth and comfort for the baby. The change of such basic bed form into the chair form does not require any addition of separately prepared new members or removal of any of the members initially provided as part of the bed; it is only necessary to displace some of the members provided in the bed while they are connected to the other members. That is, simply turning the upper side frames downwardly causes the portions directly or indirectly held by said upper side frames to change shape to open the front of the bed so as to enable the bed to be used as a chair. Therefore, there is no danger whatsoever of losing parts which is liable to occur where separable members are provided.

These objects and other objects, features, aspects and advantages of the present invention will become more apparent from the following detailed description of the present invention when taken in conjunction with the accompanying drawings.

DESCRIPTION OF PREFERRED EXAMPLE EMBODIMENTS AND OF THE BEST MODE OF THE INVENTION

Figure 1:
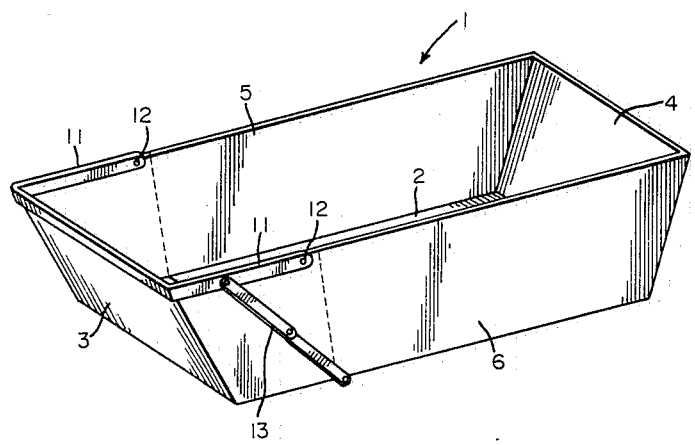
FIG. 1 is a perspective view of an embodiment of this invention, shown in the original bed form.
Figure 2:
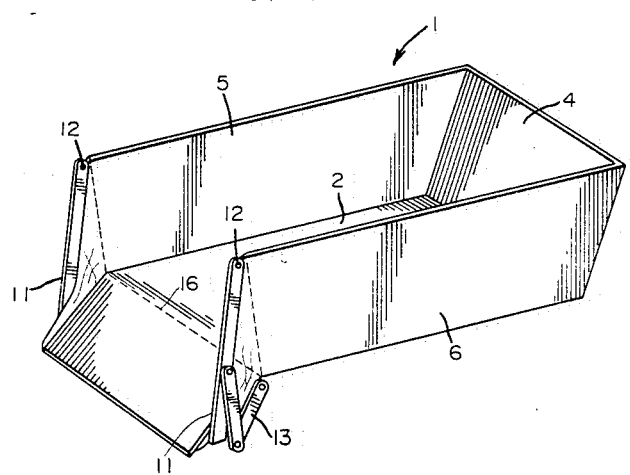
FIG. 2 shows a state in which the baby carriage bed of FIG. 1 has been changed to a chair form.

As shown in FIG. 1, the baby carriage bed 1 is in the form of a unitary box as a whole comprising a bottom wall 2, a front wall 3, a back wall 4, and left-hand and right-hand side walls 5 and 6. These walls 2 to 6 are made of suitable cloth or the like, and in some portions the flexibility of the cloth or the like is utilized while in other portions a hard core material is incorporated to provide suitable strength or stiffness.

Figure 3:
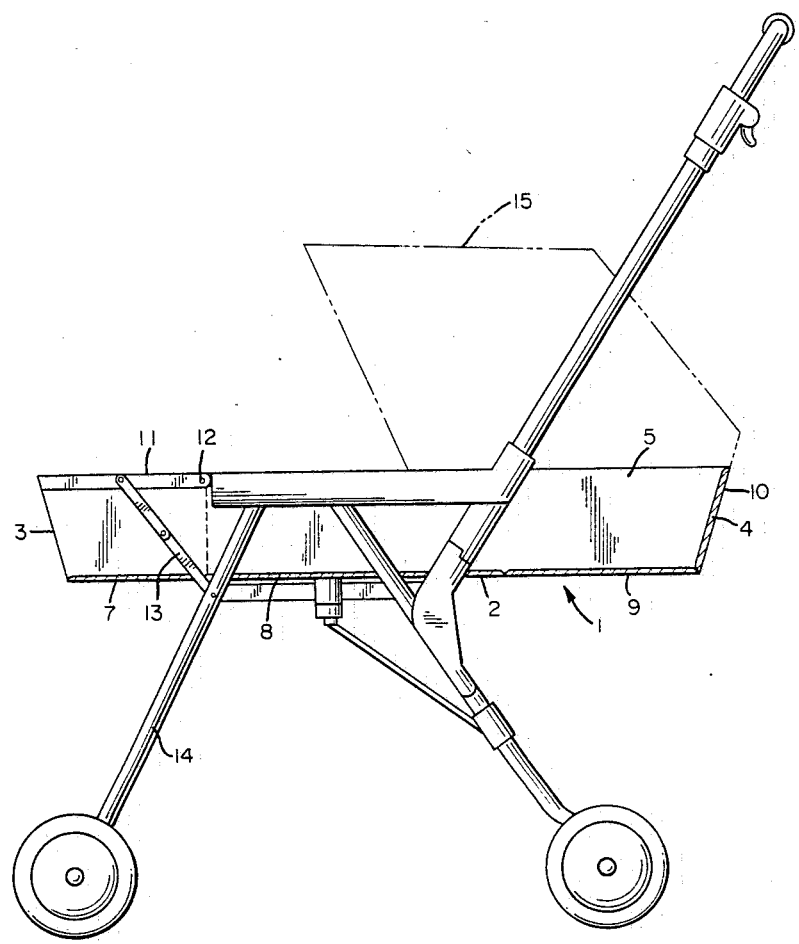
FIG. 3 is a right-hand side view showing the baby carriage bed of FIG. 1 attached to a baby carriage.
Figure 4:
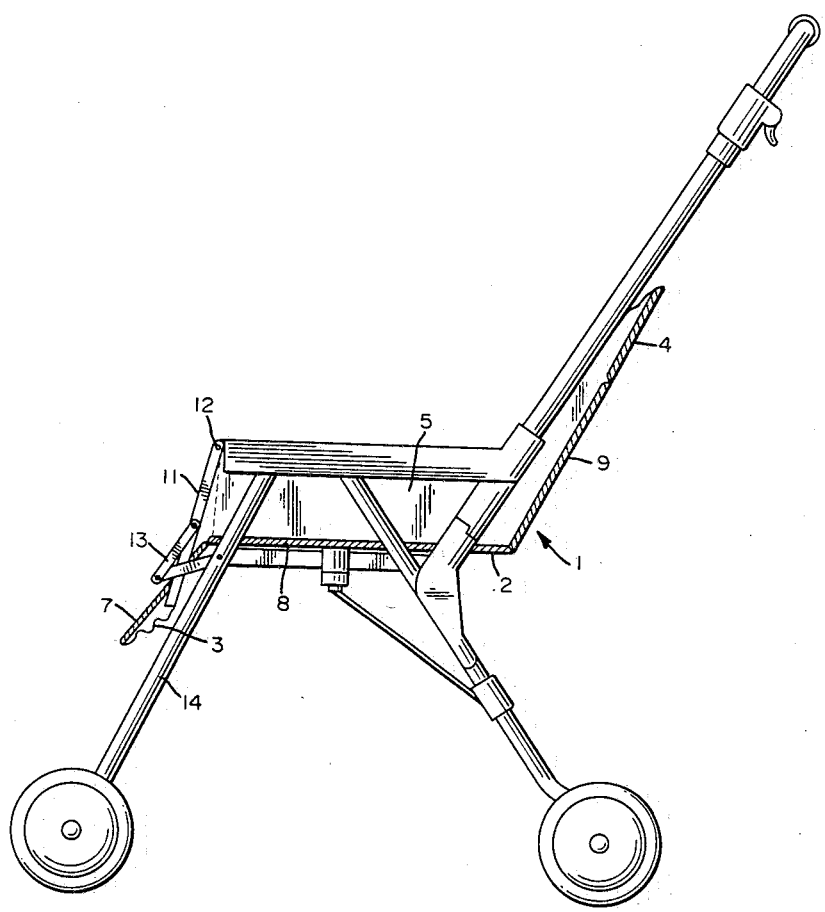
FIG. 4 shows a state in which the bed of FIG. 3 is changed to a chair form.

In FIGS. 3 and 4, the bed is shown with its right-hand side wall 6 removed. As can be seen for example from FIG. 3, the bottom wall 2 and back wall 4 have hard cores incorporated therein. Of these cores, those incorporated in the bottom wall 2 are separate cores for the front and rear portions. That is, the front portion of the bottom wall 2 has a front core 7 incorporated therein. In the illustrated embodiment, the rear portion of the bottom wall 2 is divided into two regions, forward and backward, and the forward half portion has a rear forward half core 8 incorporated therein and the backward half portion has a rear backward half core 9 incorporated therein. The back wall 4 has a back core 10 incorporated therein. The incorporation of separate cores in this manner enables the boundary lines between the individual cores to be folded.

A pair of upper side frames 11 is provided along the upper sides of the front portions of the left-hand and right-hand side walls 5 and 6 to suspend said side wall front portions. In the illustrated embodiment, as best shown in FIG. 1, the pair of upper side frames 11 is formed of a single U-shaped member. Each of the upper side frames 11 is turnably supported at its rear end by a transverse shaft 12 connected to a baby carriage frame as shown for example in FIG. 3.

The left-hand and right-hand side walls 5 and 6 have no hard cores incorporated therein; therefore, at least the front portions of the left-hand and right-hand side walls 5 and 6, namely the portions to the left of the dashed boundary lines in FIG. 1, are foldable.

Support means for retaining the horizontal position of the upper side frames 11 comprise, for example, a pair of prop links 13 each in the form of two links foldably connected together. Each prop link 13 is turnably connected at one end thereof to the associated upper side frame 11 and at the other end to the baby carriage body, for example, the associated front leg 14 of the baby carriage as shown in FIG. 3.

In the state shown in FIGS. 1 and 3, the bed 1 is shown in its original bed form. In this state, the prop links 13 extend straight, holding the upper side frames 11 in their horizontal position. In the bottom wall 2, the cores 7, 8, and 9 define a substantially horizontal plane. In this state, a hood 15 may be installed, as shown in phantom lines in FIG. 3.

When it is desired to change the bed 1 from the aforesaid bed form into the chair form, this can be attained by folding the prop links 13. To make it possible to fold the prop links 13 only when necessary, the links 13 have only to be provided with means for locking them in the straightened state. In response to the folding of the prop links 13, the upper side frames 11 are turned downwardly around the axes of the shafts 12. In response to this turning movement, the front wall 3 is downwardly displaced and the front portions of the left-hand and right-hand side walls 5 and 6 are bent while the front portion of the bottom wall 2 is folded relative to the rear portion thereof along the folding line 16. Finally, the front wall 3 is turned over to the extent that it is positioned under the front portion of the bottom wall 2, with the front portions of the left-hand and right-hand side walls 5 and 6 being bent as seen in FIG. 4. As a result, the front of the bed 1 is opened to enable the bed to be used as a chair. That is, the baby is allowed to project his or her legs through the front of the bed. At this time, the front portion of the bottom wall 2 extends along the undersides of the legs and functions to protect the legs.

In addition, as shown in FIG. 4, when the bed 1 is changed to the chair form, the backward half region of the rear portion of the bottom wall 2 may be utilized to form a backrest. In this embodiment, the shape of the bed is changed so that the portion having the rear backward core 9 incorporated therein is raised and the back wall 4 is substantially aligned with said portion. As for a mechanism for this change of shape, a mechanism shown in FIGS. 5 and 6 to be described below may be utilized.

To restore the bed 1 to its original bed form, the user raises the upper side frames 11 by one hand while correcting the shape of the front portion of the bed 1 by the other hand. When the upper side frames 11 are brought into their horizontal position, the prop links 13 will be suitably locked in position.

Figure 5:
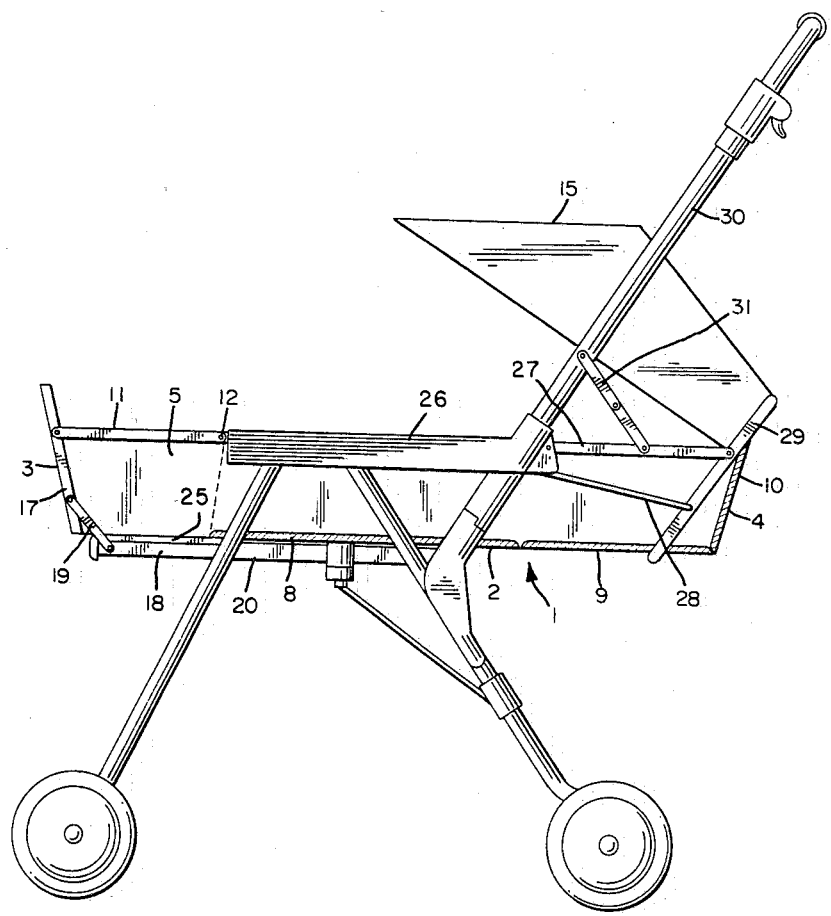
FIG. 5 is a side view of a baby carriage having another embodiment of this invention attached thereto, with the bed being shown in its original bed form.
Figure 6:
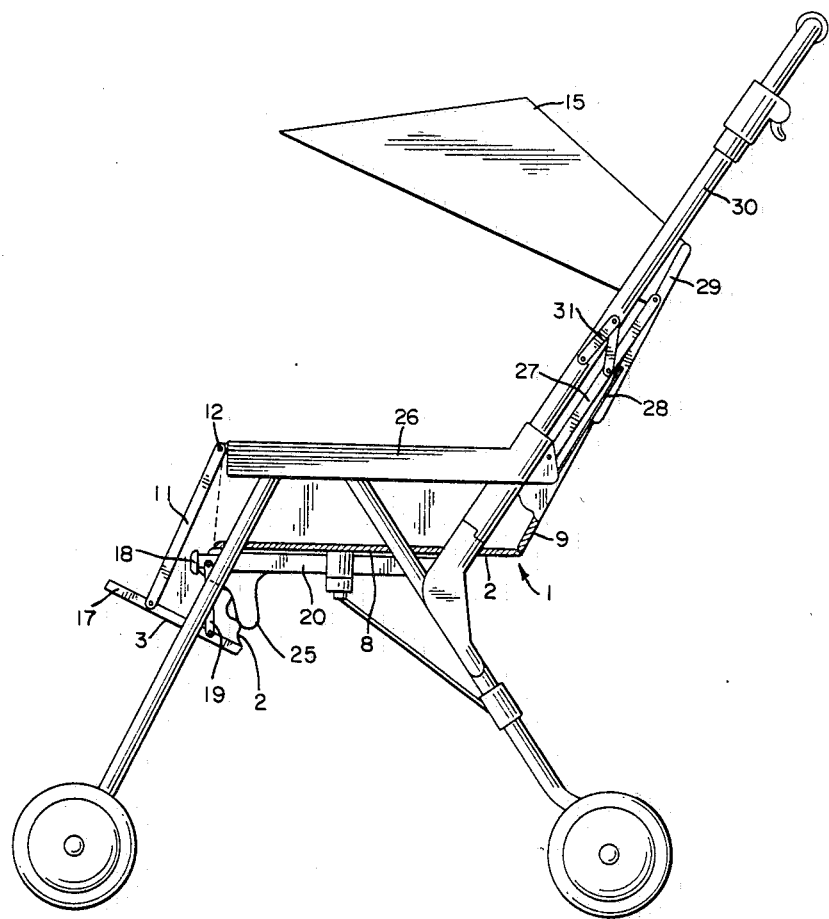
FIG. 6 shows the bed of FIG. 5 changed to a chair form.

In FIGS. 5 and 6, the bed 1 is shown with its right-hand side wall 6 removed. As compared to the preceding embodiment, the front portion of the bottom wall 2 has no core incorporated therein, so that the bed is foldable in this portion. Further, as compared with the preceding embodiment, the support means for retaining the horizontal position of the upper side frames 11 differs. This means includes a pair of front links 17 turnably connected to the front ends of the upper side frames 11 and extending along the front sides of the left-hand and right-hand side walls 5 and 6. The pair of upper side frames 11 is formed of separate members and, though not shown in detail, the front links 17 have a widthwise extending portion to serve as means for determining the distance between the upper side frames 11. A pair of draw links 18 is positioned on opposite sides of the lower surface of the bottom wall 2 and slidably extending in the direction of the length of the bed. The arrangement associated with the draw links 18 will be described below with reference to FIG. 7. A pair of connecting links 19 is connected between the front links 17 and the draw links 18.

Figure 7:
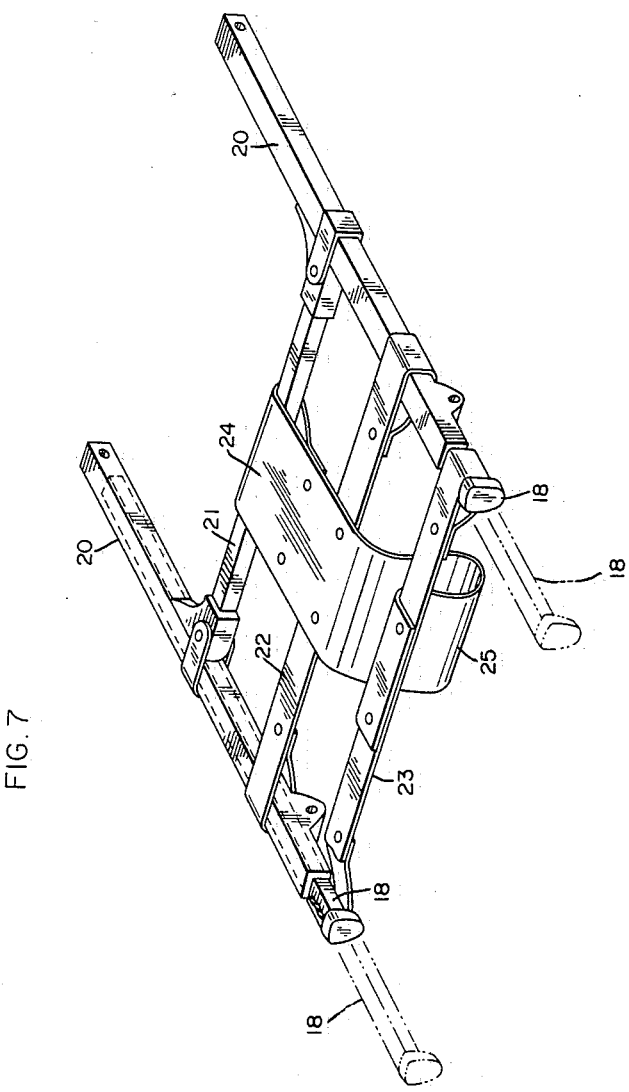
FIG. 7 shows an arrangement associated with draw links in FIGS. 5 and 6.

Referring to FIG. 7, the pair of draw links 18 is inserted in a pair of longitudinally extending tube members 20 installed on the baby carriage body whereby the draw links are slidably held. A widthwise connecting bar 21 and a first widthwise connecting belt 22 are connected between the pair of the tube members 20. Further, a second widthwise connecting belt 23 is connected between the front ends of the pair of draw links 18. In FIG. 7, the connecting links 19 to be connected to the draw links 18 are omitted from the illustration. A wide belt 24 is installed intermediate the tube members 20 to extend in parallel to the tube members 20 so as to connect the widthwise connecting bar 21 and the first and second widthwise connecting belts 22 and 23. The widthwise connecting bar 21, widthwise connecting belts 22 and 23, and wide belt 24 contact the lower surface of the bottom wall 2 of the bed 1 for supporting the bottom wall 2. The state shown in solid lines in FIG. 7 is one in which the draw links 18 are in their rearmost end position, with a slack 25 being formed in the wide belt 24. When the draw links 18 are drawn forwardly as shown in phantom lines, the slack 25 disappears and the terminal end of the forward withdrawal of the draw links 18 is defined.

Referring to FIG. 5, the bed 1 is in its original bed form. In this state, the draw links 18 have been drawn to the foremost position, with the upper side frames 11 being maintained substantially in horizontal positions by the connecting links 19 and front links 17.

When it is desired to change the bed 1 into chair form as shown in FIG. 6, the draw links 18 will be pushed rearwardly. In response thereto, the front portion of the bottom wall 2 produces a slack to allow the front wall 3 to displace downwardly thereby forming a pouch as shown in FIG. 6. The upper side frames 11 are turned downwardly and, as shown in FIG. 6, the front of the bed 1 is opened to enable the bed to be used as a chair.

Further, FIGS. 5 and 6 show an example of a construction for causing the portion of the bottom wall 2 having the rear backward half core 9 incorporated therein to rise to serve as a backrest. Main levers 27 are turnably supported at the rear ends of armrests 26 which form part of the baby carriage body. Disposed below the main levers 27 are auxiliary levers 28 turnably supported at the rear ends of the armrests 26. Bed rear portion support members 29 are held by the main and auxiliary levers 27 and 28 for supporting the rear portion of the bed 1 directly. Reclining adjustment links 31 are connected between the main levers 27 and the pusher rods 30 of the baby carriage, so that the inclined state of the main levers 27 can be changed by changing the bent state of the reclining adjustment links 31. When the main levers 27 are horizontal as shown in FIG. 5, the portion of the bottom wall 2 in the rear portion of the bed 1 supported by the bed rear portion support members 29 is also maintained in a horizontal position, providing the original bed form. As shown in FIG. 6, when the main levers 27 are raised, the bed rear portion support members 29 are upwardly displaced and the rear wall 4 is raised and so is the portion of the bottom wall 2 having the rear backward half core 9 incorporated therein. As a result, the portion containing the rear backward half core 9 cooperates with the back wall 4 to define a backrest. The auxiliary levers 28 serve to control the attitude of the bed rear portion support members 29. For example, in the state of FIG. 6, the bed rear portion support members 29 abut against the back of the bottom wall 2 to bring the back wall 4 and the portion containing the rear backward half core 9 into alignment with each other.

Figure 8:
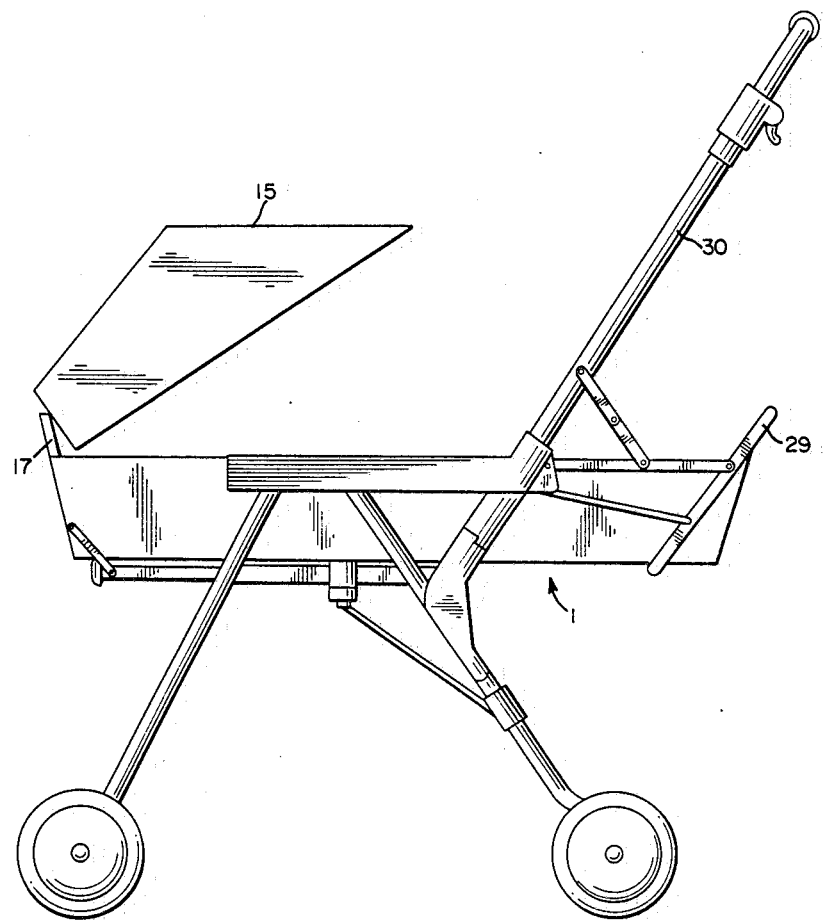
FIG. 8 shows a state in which a hood is positioned to face in a direction opposite to that shown in the baby carriage of FIG. 5.

In FIG. 5, the hood 15 is attached for example by utilizing the bed rear portion support members 29. If such hood 15 is arranged so that it can be attached to the baby carriage for example by utilizing the front links 17 as desired, as shown in FIG. 8, then two modes of use can be obtained, one in which the user pushes the baby carriage face to face with the baby (FIG. 8) and the other in which the user pushes the carriage behind the back of the baby (FIG. 5).

The embodiment shown in FIGS. 9 and 10 differs only in the following point from the embodiment described with reference to FIGS. 5 to 8; the means for retaining the horizontal position of the upper side frames 11 differs. While the draw links 18 are used without any change, the interlocking mechanism extending from the draw links 18 to the upper side frames 11 differs. In this embodiment, a pair of prop links 32 is used. These prop links 32 are connected between the upper side frames 11 and the front legs 14. The prop links 32 are turnably connected at one of their respective ends to the upper side frames 11 and at the other ends to the front legs 14. A pair of support links 33 is connected between the foldable portions of the prop links 32 and the draw links 18. The prop links 32 are so constructed that when the draw links 18 are forwardly drawn, the prop links 32 are pulled by the support links 33 until their foldable portions are positioned a little more forward than when the prop links 32 are straight. This arrangement ensures that when a load is applied to the front portion of the bed 1, this load provides a force which turns downwardly the upper side frames 11, so that even if a force is applied to the prop links 32 to fold them, this tends to pull the draw links 18 in the direction in which they slide forwardly. The forward withdrawal of the draw links 18 is limited by the side belt 24 shown in FIG. 7. If the folding would take place in the reverse direction, said load would undesirably cause the links 18 to slide rearwardly. In order to avoid such undesirable situation, the prop links 32 are arranged a little forwardly when the draw links 18 are drawn forwardly.

Figure 10:
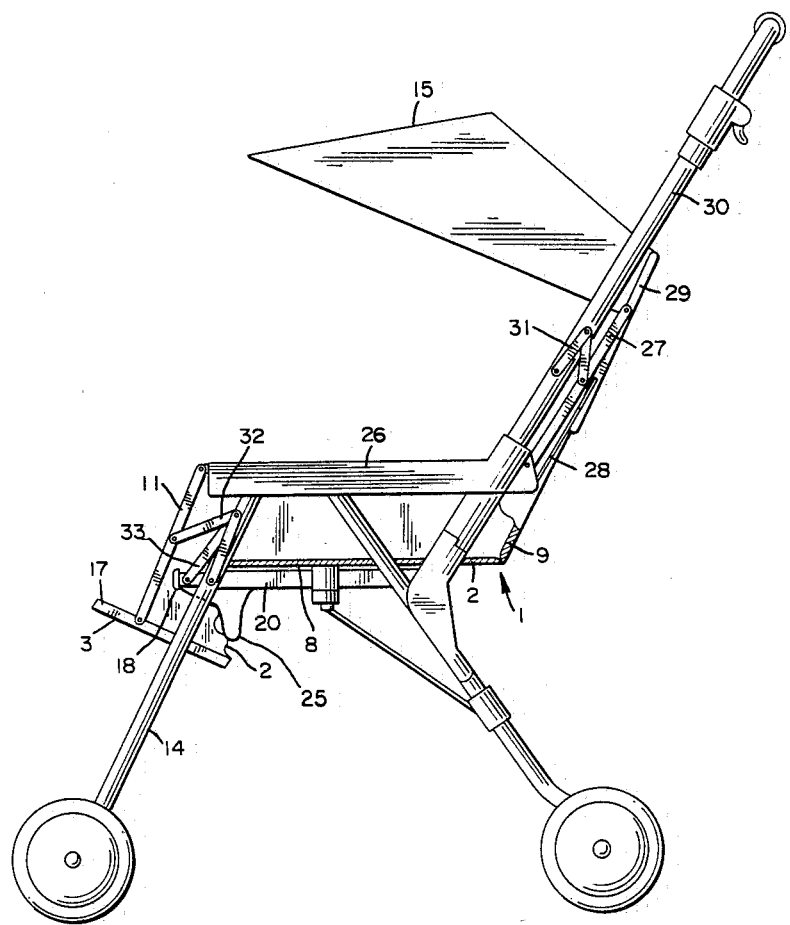
FIG. 10 shows a state in which the bed of FIG. 9 is changed to a chair form.

Referring to FIG. 10, when the draw links 18 have been pushed rearwardly, the prop links 32 are folded by the support links 33 to project upwardly. In response thereto, the upper side frames 11 are turned downwardly. Therefore, the front wall 3 is displaced downwardly and, while the front portions of the left-hand and right-hand side walls 5 and 6 are bent, the front portion of the bottom wall 2 is wrinkled to hang down. In this manner, the front of the bed 1 is opened whereby the bed is usable as a chair. The arrangement for forming the backrest is the same as that described in the preceding embodiment.

Figure 11:
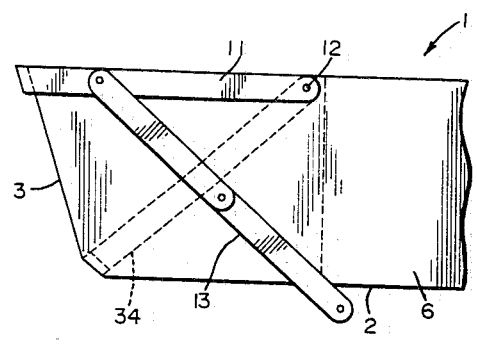
FIG. 11 is a right-hand side view showing the front of a further embodiment of this invention, with the bed being shown in its original bed form.
Figure 12:
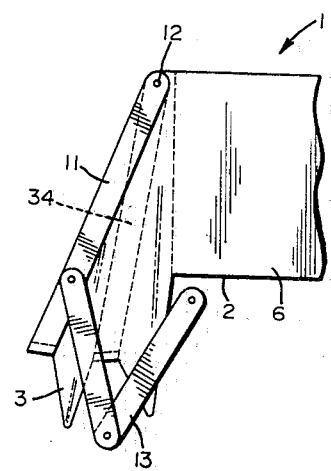
FIG. 12 shows a state in which the baby carriage bed of FIG. 11 is changed to a chair form.

The embodiment shown in FIGS. 11 and 12 is similar to that shown in FIGS. 1 to 4 and described above. That is, upper side frames 11 of similar shape are provided in a similar manner. As a means for retaining the horizontal position of said upper side frames, similar prop links 13 are provided in a similar manner.

There are two differences in the arrangement of FIGS. 11 and 12. First, a core corresponding to the front core 7 is not inserted in the front portion of the bottom wall 2, so that the front portion is left in the form of flexible cloth or the like. The second difference is that a reinforcing frame 34 is provided so that it is turnable around the axis of the shaft 12. The reinforcing frame 34, as the upper side frames 11, is formed of a member which is U-shaped as a whole, and its widthwise extending portion extends along the edge which is positioned at the intersection between the bottom and front walls 2 and 3. Such reinforcing frame 34 is preferably disposed inside the cloth or the like forming the bed 1.

In the state shown in FIG. 11, the front portion of the bed 1 is properly shaped by the presence of the reinforcing frame 34 so that the shape of the front portion required for the original bed form is retained. On the other hand, when the upper side frames 11 are turned downwardly as shown in FIG. 12, the reinforcing frame 34 is also turned downwardly, so that the front portions of the bottom wall 2 and left-hand and right-hand side walls 5 and 6 are suitably bent. As a result, the front of the bed 1 is opened for using the bed as a chair.

According to this embodiment, since the cloth or other flexible portion is divided by the reinforcing frame 34, the degree of bending of the divisional portions is lower than when the whole is bent at the same time. The bed is easy to bend and hence it can be easily shaped into bed form or chair form. This is analogous to the situation where an umbrella has a greater number of ribs, it is easier to handle the umbrella cloth when the umbrella is closed. Thus, several reinforcing frame members may be provided to shorten the spacing.

Figure 9:
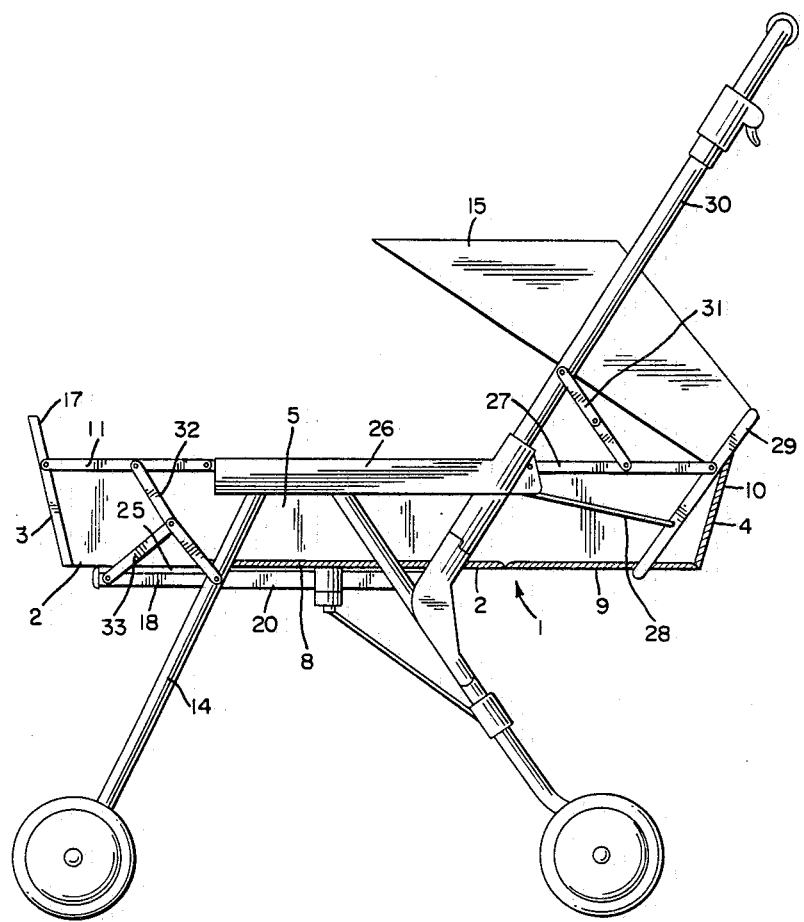
FIG. 9 is a side view of a baby carriage having another embodiment of this invention attached thereto, with the bed being shown in its original bed form.

In addition, the draw links 18 used in the embodiment represented by FIG. 5 and the embodiment represented by FIG. 9 may be used in the embodiment shown in FIGS. 1 to 4. In this case, the interlocking between the draw links 18 and for example the prop links 13 may be dispensed with and in the embodiment of FIG. 3 the use of the draw links 18 makes it possible to remove the front core 7.

While the folding operation of the baby carriage has not been referred to in the above description, it is possible to provide a bed which satisfactorily follows the folding operation of the baby carriage by suitably constructing the connections between the members forming the bed 1. Further, such bed can be applied both to foldable baby carriages and to baby carriages having no folding function.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A bed for baby carriages which is in the form of a unitary box having a bottom wall, a front wall, a back wall, a left-hand side wall, and a right-hand side wall, comprising a pair of upper side frames for suspending front portions of said left-hand and right-hand side walls, said side frames extending along upper sides of said front portions of the left-hand and right-hand side walls and are turnably supportable at their rear ends by transverse shafts connectable to a baby carriage, wherein, the front portions of the left-hand and right-hand side walls suspended by said upper side frames are made of a flexible material, a folding line is formed along the boundary line between the front and rear portions of the bottom wall, the downward turning of said upper side frames causes the front wall to be displaced downwardly, so that while the front portions of said left-hand and right-hand side walls are bent, the front portion of the bottom wall is folded rearwardly along said folding line, whereby the front is opened to enable the bed to be used as a chair, said bed further comprising support means also connectable to a baby carriage for retaining the horizontal position of said upper side frames, wherein said support means for retaining the horizontal position of said upper side frames comprises a pair of front links, first pivot means for turnably connecting said front links to front ends of the upper side frames, said front links extending along the front sides of the left-hand and right-hand side frames, a pair of draw links longitudinally slidably secured to opposite sides of said bottom wall, a pair of connecting links, second pivot means turnably securing one end of said pair of connecting links to said front ends of said draw links, third pivot means securing the other end of said pair of connecting links to said front links, whereby said connecting links are pivoted between said front links and said draw links, said bottom wall having a flexible front portion connected to said front wall, flexible support means arranged below said flexible front portion of said bottom wall and connected to the front end of said draw links for supporting said flexible front portion when said draw links are in the most forward position, said flexible support means folding out of the way when said draw links are in the rearmost position so that said flexible front portion of said bottom wall forms a slack.

2. The bed for baby carriages as set forth in claim 1, wherein said bottom wall has separate hard cores incorporated in said front and rear portions.

3. The bed for baby carriages as set forth in claim 1, wherein said bottom wall has a rear portion including a backward half portion in said rear portion of the bottom wall, and means arranged for raising said backward half portion, whereby a backrest is defined.

* * * * *